Figure 1:
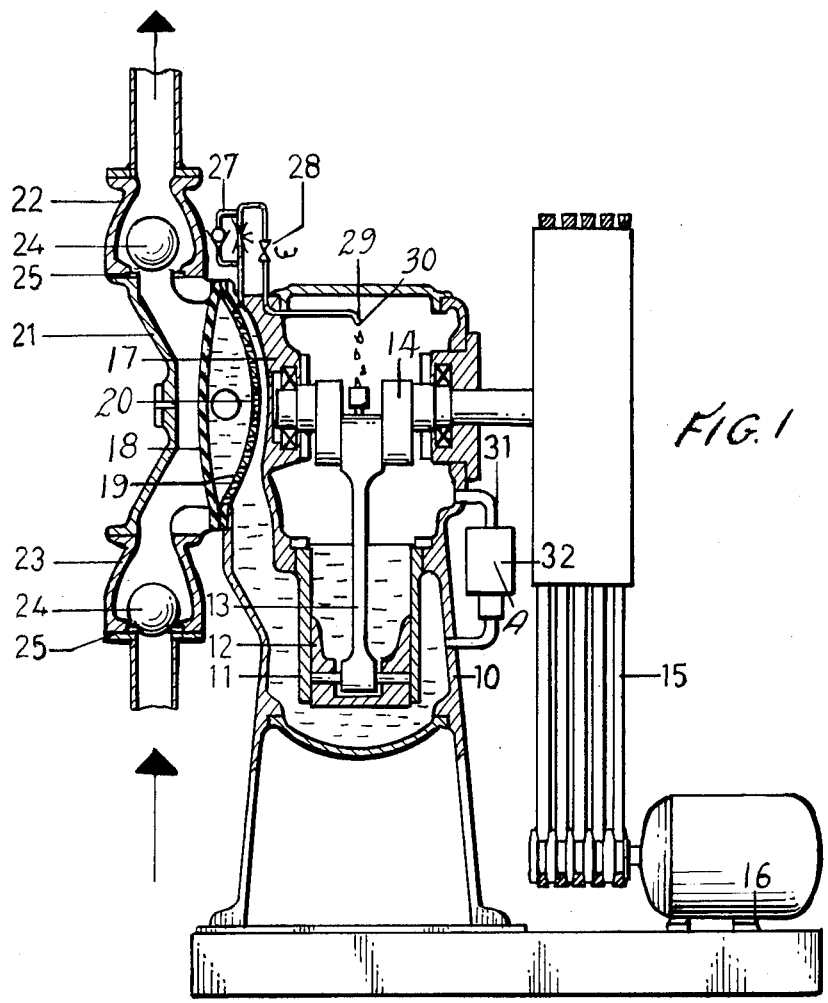

United States Patent Office 3,256,824
Patented June 21, 1966

3,256,824
METHOD AND A DEVICE FOR KEEPING THE PRESSURE MEDIUM CONSTANT IN DIAPHRAGM PUMPS
Wilhelm Sebardt, Rattviksvagen 18, Bromma, Sweden
Filed Mar. 18, 1964, Ser. No. 352,854
Claims priority, application Sweden, Apr. 9, 1963, 3,902/63
11 Claims. (Cl. 103—44)

This invention relates to diaphragm pumps of the kind in which a pulsating pressure is produced by a reciprocating plunger and transferred to a diaphragm via a non-compressive medium.

Diaphragm pumps as mentioned consist of an impulse producer usually in the form of a plunger which is given a reciprocating motion in a cylinder, which is connected with a diaphragm chamber. This chamber is provided with a diaphragm, which is limited in its motion at least on the suction side. Usually the motion is limited by a perforated plate, which mainly has the same configuration as the diaphragm has when it is in contact with the plate.

The room between the plunger and the diaphragm is filled with a non-compressive medium often in the form of an oil of suitable viscosity.

However, it has proved very difficult to obtain complete tightness between the plunger and the cylinder, which means that the oil leaks from the room between the cylinder and the diaphragm to the other side of the plunger. In order to eliminate this disadvantage the plunger has been provided with two spring loaded valves. One of them allows the oil to pass from the room between the diaphragm and the plunger to the other side of the plunger and the other one allows the oil to pass from the other side of the plunger to the room former mentioned. It is however almost impossible to adjust the valve so that the quantity of oil passing will be exactly the same in both directions. Therefore the diaphragm has been surrounded by two perforated supporting plates. The adjustment occurs thereby that the diaphragm is forced against the supporting plates whereby an under or over pressure is obtained. Such an adjustment of the oil quantity is, however, not recommended, as the diaphragm can be damaged by being forced against the supporting plates.

The pump described is quite unsuitable for pumping media which consist of a fluid with firm particles. These particles can go through the external supporting plate and form layers on this, which can damage the diaphragm.

Further the diaphragm pump described has the disadvantage that the oil in the room between the plunger and the diaphragm will take up air, which damps the transmission of the pressure impulse to the diaphragm. The efficiency of the pump decreases with the quantity of air mixed in the oil. Up to now it has been impossible to eliminate this drawback which is of very essential importance for the pump.

The present invention relates to a method of and apparatus for keeping the quantity of medium in the room between the plunger and the diaphragm constant, according to which the above mentioned drawbacks are eliminated. According to the method a limited quantity of the medium is taken out from the room between the plunger and the diaphragm and is, together with the leaking part of the medium, passed over an adjustment means, from which the part of the medium, which exceeds a formerly fixed quantity, is passed back to the room between the plunger and the diaphragm. According to the invention the quantity of medium taken out shall always exceed the quantity of the medium which is expected to leak between the plunger and the cylinder to the other side of the plunger. Further, via the adjustment means it is possible to pass back a larger quantity of the medium to the room between the plunger and the diaphragm than that which is expected to be taken out and/or leak from this room.

By the flow of the medium obtained according to the invention it is always possible to keep constant the quantity of medium in the room between the plunger and the diaphragm and the room outside the plunger. Further the essential advantages are achieved that partly the medium is vented by the flow through the system and that partly it can be used as lubricant for the connecting rod bearing of the impulse producer.

Figure 2:
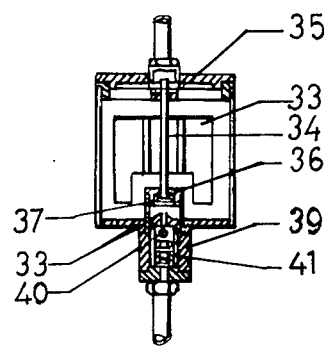

An example of a device according to the invention will be described below with reference to the enclosed drawing which shows in FIGURE 1 a vertical section of a diaphragm pump and an enlarged view of the detail A in FIGURE 2.

According to the drawing the pump consists of an impulse producer 10 including a cylinder 11, in which a plunger 12 is connected with a crank axle 14 via a connecting rod 13. The crank axle 14 is driven by a motor 16 through belts 15.

The cylinder is connected to a diaphragm chamber 17, in which a diaphragm 18 of rubber or of some other material with similar properties is applied. A supporting plate 19 is mounted on the suction side of the diaphragm and provided with a large number of holes 20. The number of holes and their diameters are chosen so that the restriction to flow will be smallest possible.

Directly connected to the diaphragm chamber a pump chamber is arranged, which is provided with two non-return valves 22 and 23. The valves in the example shown consist of rubber covered balls 24, which tighten against seats 25.

The room between the plunger 12 and the diaphragm 18 is filled with oil of a suitable viscosity. On the top of the diaphragm chamber a combined non-return and throttle valve 27 is fitted, which is connected in series with a magnetic valve 28. From the valve 28 leads a pipe 29, the mouth 30 of which emerges into the connecting rod bearing 13.

On the impulse producer a spillway 31 is arranged, which leads to a supply container 32, which is connected to the room between the plunger and the diaphragm. The container 32 is provided with a centrally fitted float valve consisting of a float 33, which is slideably mounted in vertical guides 35 and 36 by central pin 34. The lower part of the pin is provided with a gasket 37, which tightens against a seat 38.

The pipe from the container to the room between the plunger and the diaphragm is provided with a non-return valve 39 consisting of a ball 40 loaded with a spring 41.

The device described works in the following way. By every compressive stroke of the plunger a fixed quantity of oil is forced out through the cutdown valve and the magnetic valve and further out to the connecting rod, the bearings of which always get lubrication in such a way. Then the oil is collected in the room over the plunger. When the quantity of oil in this room has risen to such an extent that at the suction stroke it reaches up to and over the spillway, the excess quantity of the oil runs out from this into the container.

By choosing this adjustment quantity larger than the quantity which is expected to leak on the plunger, simultaneously as the capacity of the back flow at the suction stroke is larger than these two quantities together, it is possible to get sufficient control of the oil quantity between the plunger and the diaphragm.

To take out oil in the way described reduces of course the capacity of the pump but only to a very small extent, which has no practical importance as it amounts to only 1%.

At every suction stroke the oil is sucked from the container to the room between the plunger and the diaphragm. In order to prevent air from being sucked into this room the float valve is arranged to tighten so that all risk for air suction is eliminated.

The function of the magnetic valve is to break the oil flow when the pump is stopped. If the valve 22 is not quite tight and the magnetic valve has not broken the oil flow, the diaphragm can be loaded with a force which corresponds to the actual lift height of the pump. This can lead to the consequence that the diaphragm is forced against the supporting plate while the oil is pressed out and into the room over the plunger. When the pump thereafter is started the quantity of oil in the room between the plunger and the diaphragm is too small, whereby the diaphragm will be pressed against the supporting plate. An adjustment will soon be obtained but it is not desirable having the diaphragm pressed against the supporting plate.

At repeated practical tests it has been shown that the adjustment of the oil flow is so effective that the diaphragm works under most favourable circumstances on different work conditions.

When the oil is taken out from the diaphragm chamber it can be mixed with a lot of air, but after it has gone through the device described it is completely free from air. The device is consequently at the same time a very good venting means.

A pump carried out in accordance with the described example with a standing cylinder has the great advantage, that it has no tightenings outwards with reciprocally movable elements, through which the fluid can leak. In other words, the pump is completely tightened outwards from every kind of fluid leaks.

If the pump, as shown in the device described, is provided with a supporting plate between the diaphragm and the impulse producer, it can be completed with a safety device in the form of an overflow valve. This valve can be arranged so that if the pressure rises above a certain maximum, the oil passes over from the room between the diaphragm and the impulse producer to the room over the plunger. Thereby the oil quantity between the diaphragm and the plunger will momentarily decrease very strongly, but the diaphragm is protected by the supporting plate from curving out too much. When the pressure is normal again the diaphragm is adjusted very soon to its correct work position.

Of course, the device described is only an example, which can be changed at many points without passing away from the inventive idea.

What I claim is:

1. In a diaphragm pump of the type comprising a flexible diaphragm secured at its edges and forming on one side a movable wall for a pumping chamber, the other side of the diaphragm forming a movable wall of a pulsating liquid chamber, and a reciprocating plunger in the pulsating chamber for flexing said diaphragm back and forth by producing pulsations in the liquid in said pulsating chamber, the improvement comprising: means for regulating the quantity of liquid in the pulsating chamber so as to control the free-swinging movement of said diaphragm without pressing it against the walls of the pumping or pulsating chambers, said means comprising means for removing a limited quantity of the liquid from the pulsating chamber when the plunger moves in a liquid compressing direction, and adjustment means for receiving the liquid thus removed and the liquid which may leak past said plunger and for returning to the pulsating chamber that part of the removed liquid and the leaked liquid which exceeds a predetermined quantity, whereby the degree of movement of said diaphragm is controlled without said diaphragm being pressed against the walls of the pumping or pulsating chambers.

2. Apparatus as set forth in claim 1 wherein said means for removing a limited quantity of liquid removes a larger quantity than leaks past said reciprocating plunger.

3. Apparatus as set forth in claim 1 wherein said adjustment means returns to said pulsating chamber a larger quantity of liquid than is removed and/or leaked from said pulsating chamber during the same period.

4. Apparatus as set forth in claim 1 wherein said removing means comprises an outlet from said pulsating chamber and connected to said adjustment means, said adjusting means being separately connected to said pulsating chamber.

5. Apparatus as set forth in claim 4 wherein said outlet is located at the highest point of said pulsating chamber.

6. Apparatus as set forth in claim 4 wherein said adjustment means comprises an adjustment chamber defined in part by the face of said plunger remote from said pulsating chamber, and a spill outlet leading from said adjustment chamber to said pulsating chamber.

7. Apparatus as set forth in claim 6 further comprising a container between said spill outlet and said pulsating chamber, and a valve controlling flow through said container.

8. Apparatus as set forth in claim 7 wherein said valve is a float valve which closes when the liquid in said container falls to a predetermined level.

9. Apparatus as set forth in claim 8 further comprising a non-return valve between the outlet from said container and said pulsating chamber.

10. Apparatus as set forth in claim 1 wherein said removal means is provided with non-return and throttle valve means.

11. Apparatus as set forth in claim 10 further comprising a cut-off valve in series with said throttle valve means for closing when the pump is stopped.

References Cited by the Examiner

UNITED STATES PATENTS

| | | | |
|---|---|---|---|
| 2,444,586 | 7/1948 | Wuensch | 103—44 |
| 2,578,746 | 12/1951 | Scherger et al. | 103—44 |

FOREIGN PATENTS 1,133,628   7/1962   Germany.

ROBERT M. WALKER, *Primary Examiner.*